(12) United States Patent
Kupratis et al.

(10) Patent No.: US 11,319,882 B2
(45) Date of Patent: May 3, 2022

(54) GEAR AND ELECTRIC AMPLIFICATION OF GENERATOR MOTOR COMPRESSOR AND TURBINE DRIVES

(71) Applicant: Raytheon Technologies Corporation, Farmington, CT (US)

(72) Inventors: Daniel Bernard Kupratis, Wallingford, CT (US); Coy Bruce Wood, Ellington, CT (US); Ramesh Rajagopalan, Glastonbury, CT (US); Zubair Ahmed Baig, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/012,600

(22) Filed: Sep. 4, 2020

(65) Prior Publication Data

US 2021/0071585 A1 Mar. 11, 2021

Related U.S. Application Data

(60) Provisional application No. 62/925,799, filed on Oct. 25, 2019, provisional application No. 62/898,192, filed on Sep. 10, 2019.

(51) Int. Cl.
*F02C 7/36* (2006.01)
*B64D 27/02* (2006.01)
(Continued)

(52) U.S. Cl.
CPC ............... *F02C 7/36* (2013.01); *B64D 27/02* (2013.01); *B64D 35/02* (2013.01); *F02C 6/14* (2013.01);
(Continued)

(58) Field of Classification Search
CPC ... F02C 7/36; F02C 6/14; B64D 27/02; B64D 35/02; B64D 2027/026; F05D 2220/323;
(Continued)

(56) References Cited

U.S. PATENT DOCUMENTS 6,082,967 A 7/2000 Loisy
6,895,741 B2 5/2005 Rago et al.
(Continued)

FOREIGN PATENT DOCUMENTS

EP 3633165 A1 4/2020
EP 3751111 A1 12/2020
(Continued)

OTHER PUBLICATIONS

European Search Report for European Application No. 20180038.0 dated Nov. 10, 2020.
(Continued)

*Primary Examiner* — Shafiq Mian
(74) *Attorney, Agent, or Firm* — Carlson, Gaskey & Olds, P.C.

(57) ABSTRACT

A gas turbine engine includes a generator that is configured to be driven by a turbine section, an electric motor that is configured to receive at least a portion of electric power from the generator, a gearbox that is mechanically coupled to both the electric motor and the generator, and a control system that has an operational amplifier that is configured to synchronize operation of the electric motor and the generator. The operational amplifier electrically couples the electric motor to the generator and is configured to define an electrical gain that matches a mechanical gain that is defined by the gearbox.

14 Claims, 11 Drawing Sheets

(51) Int. Cl.
*B64D 35/02* (2006.01)
*F02C 6/14* (2006.01)

(52) U.S. Cl.
CPC .. *B64D 2027/026* (2013.01); *F05D 2220/323* (2013.01); *F05D 2220/76* (2013.01); *F05D 2240/35* (2013.01); *F05D 2260/40311* (2013.01); *F05D 2260/42* (2013.01); *F05D 2270/52* (2013.01)

(58) Field of Classification Search
CPC .............. F05D 2220/76; F05D 2240/35; F05D 2260/40311; F05D 2260/42; F05D 2270/52
See application file for complete search history.

(56) References Cited

U.S. PATENT DOCUMENTS

| | | | |
|---|---|---|---|
| 7,363,757 | B2 | 4/2008 | Loisy |
| 8,191,352 | B2 | 6/2012 | Schilling |
| 8,231,341 | B2 | 7/2012 | Anderson et al. |
| 9,822,703 | B2 | 11/2017 | Yu et al. |
| 9,938,850 | B2 | 4/2018 | Edwards et al. |
| 10,060,357 | B2 * | 8/2018 | Adams ...................... F02C 3/04 |
| 10,240,477 | B2 | 3/2019 | Ettridge et al. |
| 2004/0255590 | A1 * | 12/2004 | Rago .......................... F02C 7/32 |
| | | | 60/772 |
| 2010/0126178 | A1 * | 5/2010 | Hyde ....................... F01D 15/10 |
| | | | 60/767 |
| 2015/0267788 | A1 | 9/2015 | Ishihara |
| 2016/0160867 | A1 | 6/2016 | Gehlot |
| 2016/0229549 | A1 * | 8/2016 | Mitrovic ................. F16H 3/666 |
| 2017/0082033 | A1 | 3/2017 | Wu et al. |
| 2017/0349293 | A1 | 12/2017 | Klemen et al. |
| 2018/0003071 | A1 | 1/2018 | Lents et al. |
| 2019/0128181 | A1 | 5/2019 | Smith |
| 2019/0145322 | A1 | 5/2019 | Sellick et al. |
| 2019/0368424 | A1 * | 12/2019 | Kupratis ................... F02C 7/32 |
| 2020/0003115 | A1 | 1/2020 | Jones et al. |
| 2020/0109685 | A1 * | 4/2020 | Kupratis ................... F02K 3/06 |

FOREIGN PATENT DOCUMENTS

| | | |
|---|---|---|
| RO | 133355 | 5/2019 |
| WO | 2017036657 A1 | 3/2017 |
| WO | 2018203941 A2 | 11/2018 |

OTHER PUBLICATIONS

European Search Report for European Application No. 20180046.3 dated Dec. 1, 2020.
European Search Report for European Application No. 19201732.5 dated Feb. 26, 2020.
Search Report for Application No. GB2014189.1 dated Mar. 3, 2021.

* cited by examiner

GEAR AND ELECTRIC AMPLIFICATION OF GENERATOR MOTOR COMPRESSOR AND TURBINE DRIVES

REFERENCE TO RELATED APPLICATION

This application claims priority to U.S. Provisional Application Ser. No. 62/898,192 filed on Sep. 10, 2019 and 62/925,799 filed Oct. 25, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Electric generators and motors have been incorporated into engines to produce electric energy for various engine and aircraft support systems. However, primary power production and operation relies on conversion of the high-energy exhaust gas flow into mechanical power. Integration of electric motors into operation of turbine engines is of increasing interest to improve engine efficiencies.

Turbine engine manufacturers continually seek improvements to engine performance including improvements to thermal, transfer and propulsive efficiencies.

SUMMARY

A gas turbine engine according to an exemplary embodiment of this disclosure, among other possible things includes, a generator that is configured to be driven by a turbine section, an electric motor that is configured to receive at least a portion of electric power from the generator, a gearbox that is mechanically coupled to both the electric motor and the generator, and a control system that has an operational amplifier that is configured to synchronize operation of the electric motor and the generator. The operational amplifier electrically couples the electric motor to the generator and is configured to define an electrical gain that matches a mechanical gain that is defined by the gearbox.

In a further embodiment of the foregoing, the gearbox is an epicyclic star gear system with a sun gear. A plurality of intermediate gears are in meshing engagement with the sun gear and a ring gear is in meshing engagement with the plurality of intermediate gears. The mechanical gain defined by the gearbox is equal to a ratio of a radius of the ring gear to a radius of the sun gear.

In a further embodiment of any of the foregoing, the electrical gain is equal to a ratio of a feedback resistance ($R_F$) to an input resistance ($R_{IN}$) and the electrical gain is equal to the mechanical gain.

In a further embodiment of any of the foregoing, the plurality of intermediate gears are supported in a carrier and the carrier is selectively grounded to a fixed structure of the gas turbine engine.

In a further embodiment of the foregoing, the ring gear is coupled to the generator and the electric motor is coupled to the sun gear.

In a further embodiment of any of the foregoing, the gearbox is an epicyclic planet gear system with a sun gear that is in meshing engagement with a plurality of intermediate gears that are supported in a carrier and the plurality of intermediate gears are in meshing engagement with a ring gear. The electric motor is coupled to the sun gear. The generator is coupled to a carrier and the mechanical gain is equal to one plus a ratio of a diameter of the ring gear to a diameter of the sun gear.

In a further embodiment of any of the foregoing, the electrical gain is equal to one plus a ratio of a feedback resistance ($R_F$) to an input resistance ($R_{IN}$) and the electrical gain is equal to the mechanical gain.

In a further embodiment of any of the foregoing, the ring gear is selectively grounded to a fixed structure of the gas turbine engine.

In a further embodiment of any of the foregoing, the gas turbine engine includes a fan that is configured to be driven by an output of the gearbox.

In a further embodiment of any of the foregoing, the gas turbine engine includes a compressor with a first compressor section that is configured to be driven by the turbine section and a second compressor section that is configured to be driven by the electric motor.

A gas turbine engine according to an exemplary embodiment of this disclosure, among other possible things includes, a fan that is configured for rotation about an engine longitudinal axis, a fan drive system that is configured to drive the fan. The fan drive system includes a turbine section, a turbine generator that is electrically coupled to a turbine motor and a gear box. The turbine section and the turbine motor are coupled to drive portions of the gearbox and an output of the gearbox is configured to drive rotation of the fan. The gas turbine engine further includes a control system that is configured to synchronize operation of the turbine generator with the turbine motor. The control system has an operational amplifier that provides an electrical gain. The electrical gain is configured to match a mechanical gain that is defined by the gearbox to synchronize operation of the turbine motor with the turbine generator.

In a further embodiment of any of the foregoing, the gearbox is an epicyclic star gear system with a sun gear. A plurality of intermediate gears are in meshing engagement with the sun gear and a ring gear is in meshing engagement with the plurality of intermediate gears. The sun gear is coupled to the electric motor and the mechanical gain of the gearbox is equal to a ratio of a radius of the ring gear to a radius of the sun gear and the electrical gain is equal to a ratio of a feedback resistance ($R_F$) to an input resistance ($R_{IN}$) and the electrical gain is equal to the mechanical gain.

In a further embodiment of any of the foregoing, the output of the gearbox configured to drive the fan is the ring gear. The plurality of intermediate gears are supported in a carrier. The carrier is selectively grounded to a fixed structure of the gas turbine engine.

In a further embodiment of any of the foregoing, the turbine section includes a low pressure turbine and the turbine generator is coupled to the low pressure turbine and both the low pressure turbine and the turbine generator are coupled to the ring gear.

In a further embodiment of any of the foregoing, the gearbox is an epicyclic planet gear system with a sun gear that is in meshing engagement with a plurality of intermediate gears supported in a carrier. The plurality of intermediate gears are in meshing engagement with a ring gear. The turbine motor is coupled to the sun gear. The turbine generator is coupled to the carrier. The mechanical gain is equal to one plus a ratio of a diameter of the ring gear to a diameter of the sun gear and the electrical gain is equal to one plus a ratio of a feedback resistance ($R_F$) to an input resistance ($R_{IN}$) and the electrical gain is equal to the mechanical gain.

In a further embodiment of any of the foregoing, the gearbox output configured to drive the fan is the carrier and the ring gear is selectively grounded to a fixed structure of the gas turbine engine.

In a further embodiment of any of the foregoing, the turbine section includes a low pressure turbine and the turbine generator is coupled to the low pressure turbine and both the low pressure turbine and the turbine generator are coupled to the carrier.

A gas turbine engine according to an exemplary embodiment of this disclosure, among other possible things includes a compressor assembly that includes a first compressor section and a second compressor section. The first compressor section is coupled to a turbine section and a compressor generator. The second compressor section is coupled to a compressor motor. The first compressor section and the second compressor section are in flow communication with a combustor. The gas turbine engine also includes a gearbox that is configured to couple the compressor motor to the compressor generator. The gas turbine engine further includes a control system that is configured to synchronize operation of the compressor generator with the compressor motor. The control system has an operational amplifier that provides an electrical gain. The electrical gain is matched to a mechanical gain that is defined by the gearbox to synchronize operation of the compressor motor with the compressor generator.

In a further embodiment of any of the foregoing, the gearbox is an epicyclic star gear system with a sun gear. A plurality of intermediate gears are in meshing engagement with the sun gear and a ring gear is in meshing engagement with the plurality of intermediate gears. The sun gear is coupled to the compressor motor and the mechanical gain of the gearbox is equal to a ratio of a radius of the ring gear to a radius of the sun gear and the electrical gain is equal to a ratio of a feedback resistance ($R_F$) to an input resistance ($R_{IN}$) and the electrical gain is equal to the mechanical gain.

In a further embodiment of any of the foregoing, the plurality of intermediate gears are supported in a carrier. The carrier is selectively grounded to a fixed structure of the gas turbine engine.

In a further embodiment of any of the foregoing, the gearbox is an epicyclic planet gear system with a sun gear that is in meshing engagement with a plurality of intermediate gears that are supported in a carrier. The plurality of intermediate gears are in meshing engagement with a ring gear. The compressor motor is coupled to the sun gear. The compressor generator is coupled to the carrier. The mechanical gain is equal to one plus a ratio of a diameter of the ring gear to a diameter of the sun gear and the electrical gain is equal to one plus a ratio of a feedback resistance ($R_F$) to an input resistance ($R_{IN}$) and the electrical gain is equal to the mechanical gain.

In a further embodiment of any of the foregoing, the ring gear is selectively grounded to a fixed structure of the gas turbine engine.

A fan drive system according to an exemplary embodiment of this disclosure includes, among other things, a fan configured for rotation about an engine longitudinal axis, a fan drive system configured to drive the fan, the fan drive system including a turbine section, a turbine generator electrically coupled to a turbine motor and a gear box, wherein the turbine section and the turbine motor are coupled to drive portions of the gearbox and an output of the gearbox is configured to drive rotation of the fan and a control system configured to synchronize operation of the turbine generator with the turbine motor, the control system having an operational amplifier providing an electrical gain, wherein the electrical gain is configured to match a mechanical gain defined by the gearbox to synchronize operation of the turbine motor with the turbine generator.

In a further embodiment of the foregoing fan drive system, the gearbox is an epicyclic star gear system with a sun gear, a plurality of intermediate gears in meshing engagement with the sun gear and a ring gear in meshing engagement with the plurality of intermediate gears, wherein the sun gear is coupled to the electric motor and the mechanical gain of the gearbox is equal to a ratio of a radius of the ring gear to a radius of the sun gear and the electrical gain is equal to a ratio of a feedback resistance ($R_F$) to an input resistance ($R_{IN}$) and the electrical gain is equal to the mechanical gain.

In a further embodiment of any of the foregoing fan drive systems, the output of the gearbox configured to drive the fan is the ring gear, the plurality of intermediate gears are supported in a carrier, and the carrier is selectively grounded to a fixed structure of the gas turbine engine.

In a further embodiment of any of the foregoing fan drive systems, the turbine section includes a low pressure turbine and the turbine generator is coupled to the low pressure turbine and both the low pressure turbine and the turbine generator are coupled to the ring gear.

In a further embodiment of any of the foregoing fan drive systems, the gearbox is an epicyclic planet gear system with a sun gear in meshing engagement with a plurality of intermediate gears supported in a carrier, the plurality of intermediate gears are in meshing engagement with a ring gear, the turbine motor is coupled to the sun gear, the turbine generator is coupled to the carrier, the mechanical gain is equal to one plus a ratio of a diameter of the ring gear to a diameter of the sun gear and the electrical gain is equal to one plus a ratio of a feedback resistance ($R_F$) to an input resistance ($R_{IN}$) and the electrical gain is equal to the mechanical gain.

In a further embodiment of any of the foregoing fan drive systems, the gearbox output configured to drive the fan is the carrier and the ring gear is selectively grounded to a fixed structure of the gas turbine engine.

In a further embodiment of any of the foregoing fan drive systems, the turbine section includes a low pressure turbine and the turbine generator is coupled to the low pressure turbine and both the low pressure turbine and the turbine generator are coupled to the carrier.

A compressor assembly according to an exemplary embodiment of this disclosure including, among other possible things, a first compressor section, the first compressor section is coupled to a turbine section and a compressor generator, a second compressor section, the second compressor section coupled to a compressor motor, wherein the first compressor section and the second compressor section are in flow communication with a combustor, a gearbox configured to couple the compressor motor to the compressor generator and a control system configured to synchronize operation of the compressor generator with the compressor motor, the control system having an operational amplifier providing an electrical gain, wherein the electrical gain is matched to a mechanical gain defined by the gearbox to synchronize operation of the compressor motor with the compressor generator.

In a further embodiment of the foregoing compressor assembly, the gearbox is an epicyclic star gear system with a sun gear, a plurality of intermediate gears in meshing engagement with the sun gear and a ring gear in meshing engagement with the plurality of intermediate gears, wherein the sun gear is coupled to the compressor motor and the mechanical gain of the gearbox is equal to a ratio of a radius of the ring gear to a radius of the sun gear and the electrical gain is equal to a ratio of a feedback resistance ($R_F$) to an input resistance ($R_{IN}$) and the electrical gain is equal to the mechanical gain.

In a further embodiment of any of the foregoing compressor assemblies, the plurality of intermediate gears are supported in a carrier, and the carrier is selectively grounded to a fixed structure of the gas turbine engine.

In a further embodiment of any of the foregoing compressor assemblies, the gearbox is an epicyclic planet gear system with a sun gear in meshing engagement with a plurality of intermediate gears supported in a carrier, the plurality of intermediate gears are in meshing engagement with a ring gear, the compressor motor is coupled to the sun gear, the compressor generator is coupled to the carrier, the mechanical gain is equal to one plus a ratio of a diameter of the ring gear to a diameter of the sun gear and the electrical gain is equal to one plus a ratio of a feedback resistance ($R_F$) to an input resistance ($R_{IN}$) and the electrical gain is equal to the mechanical gain.

In a further embodiment of any of the foregoing compressor assemblies, the ring gear is selectively grounded to a fixed structure of the gas turbine engine.

Although the different examples have the specific components shown in the illustrations, embodiments of this invention are not limited to those combinations. It is possible to use some of the components or features from one of the examples in combination with features or components from another one of the examples.

These and other features disclosed herein can be best understood from the following specification and drawings, the following of which is a brief description.

DETAILED DESCRIPTION

Disclosed examples of an Electro-Aero-Thermal Turbine Engine and control scheme provides for mixing and matching of different flow capacity compressors and turbines. In the example turbine engines, fuel and electricity are converted to mechanical power to increase kinetic energy of flows through the engine. Conversion of fuel to mechanical power is accomplished by combining the fuel with high pressure air and igniting the mixture to produce a high energy gas flow. The high energy gas flow is converted to mechanical energy as it expands through the turbine section. Electro-chemical potential energy stored in a battery is converted to mechanical power by electric motors to increase kinetic energy of engine flows. Conversion of fuel to mechanical power is not as efficient as the conversion of electro-chemical potential energy to mechanical power. The disclosed example engines integrate fuel and electro-chemical power to improve overall engine efficiencies.

Figure 1:
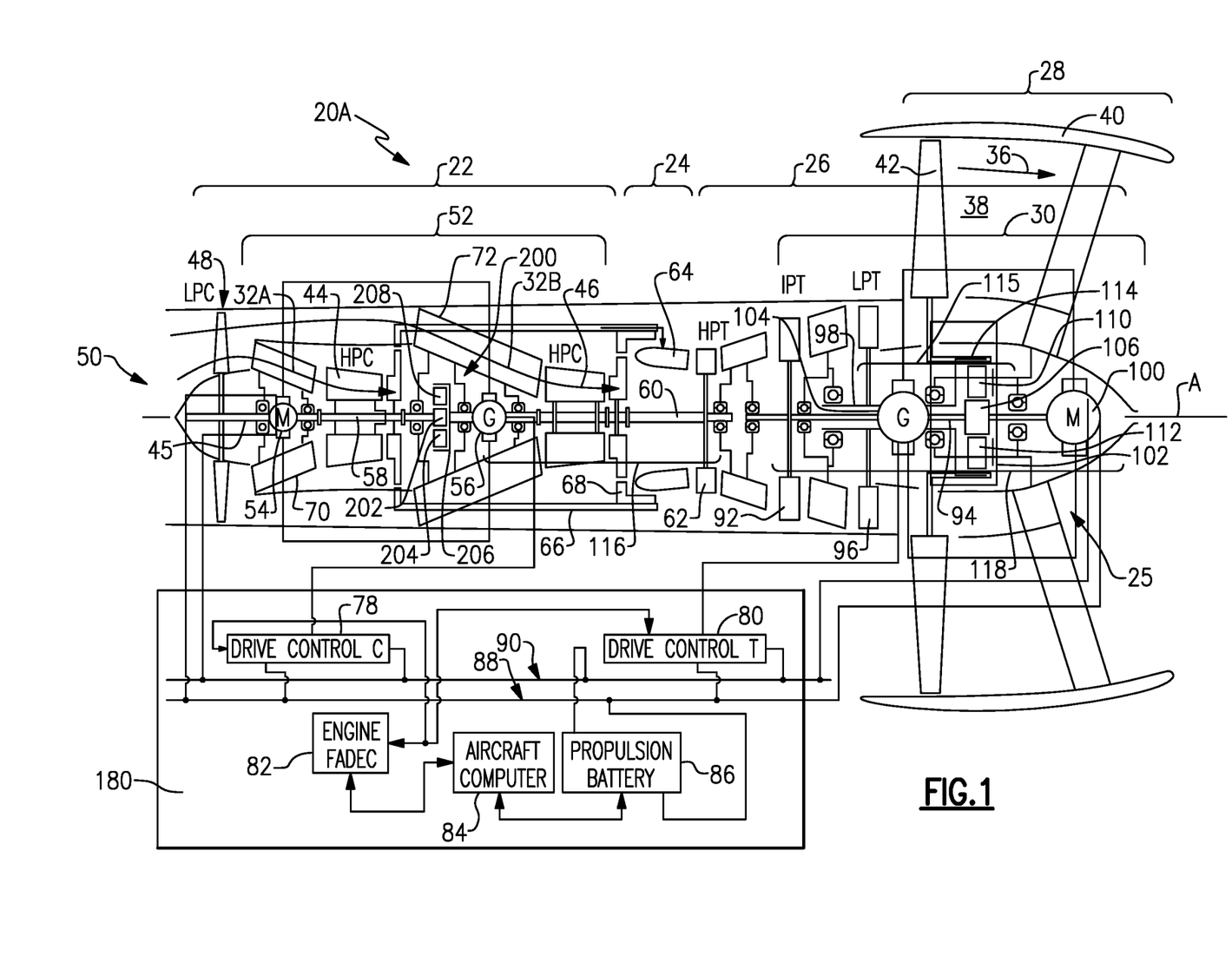
FIG. 1 is a schematic view of an example Electro-Aero-Thermal Turbine engine embodiment.

Referring to FIG. 1, a disclosed integrated engine architecture is schematically indicated at 20A. The engine 20A is a ducted fan turbine engine with fan blades 42 of a fan section 28 directing airflow 36 through a bypass flow path 38 defined through a nacelle 40. The engine 20A includes a compressor section 22, a combustor section 24, a turbine section 26 and the fan section 28 arranged serially along an engine longitudinal axis A. The fan section 28 is disposed axially aft of the turbine section 26. It should be appreciated that the arrangement of the compressor, combustor, turbine and fan section are disclosed by way of example and that other serial arrangements are within the scope and contemplation of this disclosure. For example, the fan section maybe disposed at a forward most location.

The engine 20A includes integrated electric machines in the compressor section 22 and the turbine section 26 to supplement power produced from fuel with electric power. In this disclosure, the term electric machine is utilized to describe a device that converts electric-chemical energy into mechanical power or mechanical power into electro-chemical energy, such as for example, a generator or an electric motor.

The example compressor section 22 includes a compressor electric motor 54 that is electrically coupled to a compressor generator 56. The example turbine section 26 includes a turbine electric motor 100 that is coupled to a gearbox 102 to supplement mechanical power driving the fan section 28. A turbine generator 104 driven by a portion of the turbine section 26 provides at least a portion of electric power to the turbine electric motor 100. Electric power for each of the compressor motor 54 and the turbine motor 100 may be from a propulsion battery 86 or directly from the corresponding one of the compressor generator 56 and turbine generator 104.

The compressor section 22 receives airflow through inlet 50 and supplies compressed air to the combustor 64. Fuel is combined with compressed air from the compressor section 22 and ignited in the combustor 64 to generate a high energy exhaust gas flow 34. The high energy exhaust gas flow 34 expands through the turbine section 26 to drive rotation of the turbine section 26.

The compressor section 22 includes a low pressure compressor section 48 that is axially forward of a high pressure compressor assembly 52A. The terms "low" and "high"

relate to relative operating pressures between the low pressure compressor section 48 and the high pressure compressor section 52A. The inlet airflow is initially compressed by the low pressure compressor 48 and communicated aft to the high pressure compressor assembly 52.

The high pressure compressor assembly 52A includes a first compressor section 44 and a second compressor section 46 that operate independent of each other to provide compressed airflow to the combustor 64. Airflow exiting the low pressure compressor 48 is split into a first core airflow 32A and a second core airflow 32B. The first core airflow 32A is communicated through an inner duct 70 to the first compressor section 44. The second core airflow 32B is communicated through an outer duct 72 to the second compressor section 46. The inner duct 70 is radially inward and axially forward of the outer duct 72. The inner duct 70 and outer duct 72 maybe disposed annularly about the axis A.

The first compressor section 44 is coupled to the compressor motor 54 by motor shaft 58. The low pressure compressor 48 is also driven by a forward shaft 45 coupled to the compressor motor 54. The second compressor section 46 is aft of the first compressor section 44 and is coupled to a high pressure turbine 62 by shaft 60. The first compressor section 44 and the second compressor section 46 may therefore operate and rotate independent of each other. The high pressure turbine 62 drives the compressor generator 56 that is also coupled to the shaft 60. The compressor generator 56 creates electric power that provides at least a portion of the electric power utilized to drive the compressor motor 54.

In this example, the first compressor section 44 and the second compressor section 46 are configured such that they provide an airflow at a common pressure and volume to the combustor 64 through passages 66, 68. The compressor electric motor 54 drives the first compressor section 44 to match operation of the second compressor section 46 that is driven by the high pressure turbine 62. The first compressor section 44 does not induce a load on the high pressure turbine section 62, but still provides a portion of the compressed air utilized in the combustor 64 to generate the high energy gas flow 34.

Because the first compressor section 44 is powered by the compressor electric motor 54, the first compressor section 44 does not induce a load on the high pressure turbine 62. Reducing the load on the high pressure turbine 62 provides structural changes that can improve engine efficiency. The reduced load on the high pressure turbine 62 can improve reaction changes between engine operating conditions and improve engine efficiency. Moreover, the overall capacity of the high pressure compressor 52 can be tailored to operational needs by controlling operation of the first compressor section 44 driven by the electric motor 54. The first compressor section 44 can be run at a lower capacity compared to the second compressor section 46 to match airflow to the combustor 64 with engine operation.

A compressor gearbox 200 is coupled between the compressor motor 54 and the compressor generator 56. The compressor gearbox 200 is an epicyclic gearbox with a sun gear 202 disposed about the axis A and in meshing engagement to a plurality of intermediate gears 204 supported in a carrier 208. The intermediate gears 204 are circumscribed by a ring gear 206. The sun gear 202 is coupled to the compressor motor 54 and the ring gear 206 is coupled to the compressor generator 56.

The disclosed turbine section 26 includes the high pressure turbine 62, an intermediate pressure turbine 92 and a low pressure turbine 96. The designations, "high", "intermediate" and "low" indicated relative operating pressures. The turbine sections 62, 92 and 96 are serially arranged from the combustor section 24 to the fan section 28. The high energy exhaust gas flow 34 expands axially aft through the turbine sections 62, 92 and 96 and exhausts through a core nozzle 25.

The disclosed example engine 20A is arranged to include first, second and third spools 116, 118 and 115. The first spool 116 that includes the high pressure turbine 62, the second high pressure compressor section 46 and the compressor generator 56 all coupled together by shaft 60. The second spool 118 includes the intermediate turbine 92 that is coupled to the electric motor 100 through shaft 94. The third spool 115 includes the low pressure turbine 96 that is coupled to a portion of a turbine gearbox 102. The turbine gearbox 102 is part of a fan drive system 30 provided for rotating the fan blades 42.

The turbine gearbox 102 is configured to receive inputs from one of the turbine sections and the motor to drive the fan 28 through a gearbox output. The example turbine gearbox 102 is an epicyclic star gearbox with a sun gear 106 in meshing engagement with a plurality of intermediate gears 110 supported in a carrier 112. A ring gear 114 circumscribes the plurality of intermediate gears 110. The turbine motor 100 is coupled to the sun gear 106 and the turbine generator 104 is coupled to the ring gear 114. In this disclosed example, the gearbox output is through the ring gear 114. Accordingly, the fan 28 is coupled to and driven by the ring gear 114.

Control and synchronization of the compressor and turbine motors 54,100 with the compressor and turbine generators 56, 104 is provided by a control system 180. The control system 180 includes a compressor drive control C 78 and a turbine drive control T 80. The control system 180 provides an electrical system that couples each of the generators 56, 104 to the corresponding motors 54, 100. The electric system may include DC BUS 88 and DC BUS 90 to communicate electric power and control signals to the various electric machines. The control system 180 is in communication with the engine FADEC 82 and an aircraft computer 84. Electric power to operate the compressor and turbine motors 54,100 may be supplemented by a propulsion battery 86.

Figure 2:
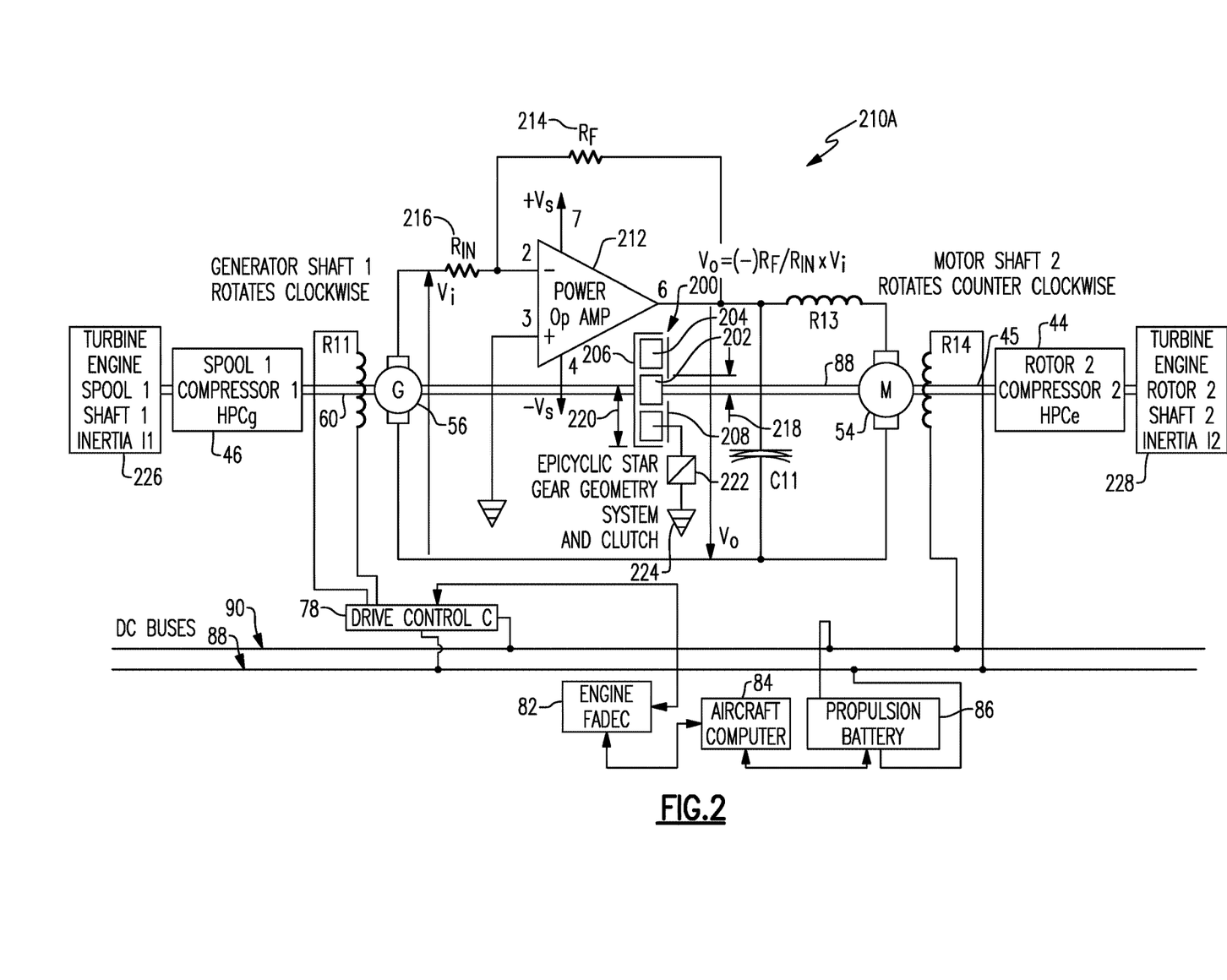
FIG. 2 is a schematic view of a control system for a compressor assembly of the Electro-Aero-Thermal Turbine engine embodiment.

Referring to FIG. 2, with continued reference to FIG. 1, a compressor drive control system 210A is augmented and controlled by adding an operational amplifier 212 providing an electrical coupling between the compressor motor 54 and compressor generator 56. The operational amplifier 212 is an electric analog to the mechanical epicyclic star gearbox 200. The motor 54, the generator 56 and the operational amplifier 212 match the mechanical gain of the gearbox 200 to bridge and connect the electric motor powered first compressor section 44 with the turbine driven second compressor section 46.

The compressor drive control system 210A provides for coordinating operation between the motor driven first compressor section 44 and the turbine driven second compressor section 46. The first compressor section 44 is driven by rotating structures such as the shaft 45 that generate an inertia schematically indicated at 228. The second compressor section 46 is part of the first spool 116 driven by the high pressure turbine 62 with a different inertia 226. Resistances of the drive control and electrical machines' fields and armatures are indicated at R11, R13, and R14. A capacitance C11 is adjusted to coordinate a speed response of the electric driven first compressor section 44 because inertia of the rotating structures 228 are different from inertial generated by the structures of the first spool 116. The resistance of each of the resistors R11, R13, R14 and the capacitance of the capacitor C11 of the motor 54 and generator 56 are sized to coordinate operation of two compressors 44, 46. Operation of the compressor sections 44, 46 provided by the control system 210A compensates for differences in flow capacity and rotational speeds to provide substantially the same airflow and pressure at the combustor 64. The control system 210A provides this operation over DC bus circuits 88, 90.

The operational amplifier input resistance $R_{IN}$ 216 is matched to the generator 56 armature resistance. The feedback resistance, $R_F$ 214, is set so that the gain of the inverting operational amplifier matches the compressor gearbox speed ratio. In this example, the compressor gearbox 200 is a star gear system with the carrier 208 selectively fixed to a fixed structure 224 of the gas turbine engine 20A through a clutch 222. The mechanical gain of the compressor gearbox 200 is equal to a ratio of a radius the ring gear 220 to a radius of the sun gear 218 (Radius (ring)/Radius (sun)). The inverting gain provided by the operational amplifier 212 is set to match the mechanical gain reflected in the ratio of the ring gear radius to the sun gear radius.

Accordingly, the electrical or inverting gain provided by the operational amplifier is equal to the ratio of the feedback resistance $R_F$ 214 to the input resistance $R_{IN}$ 216 ($R_F/R_{IN}$). Therefore, the ratio of the ring gear radius to the sun gear radius is equal to the ratio of the feedback resistance to the input resistance (Radius$_{Ring}$/Radius$_{sun}$)=($R_F/R_{IN}$). The compressor control system 210 provides control of an electrical coupling of the compressor generator 56 and the compressor motor 54 to provide matched operation of the first compressor section 44 and the second compressor section 46.

The operational amplifier provides the electric gain with selection of an input resistance provided by resistor $R_{IN}$ 216 and an output resistance provided by resistor $R_F$ 214. Matching is provided by selection of stator field windings, R11, and R14, and motor 54 armature resistance, R13. A capacitance, C11, improves the transient speed response of the electric compressor for compatibility with the fuel driven compressor. The clutch 222 can modify the gain of the system by selective engagement with the engine static structure 224 to limit movement of the carrier 208.

Figure 3:
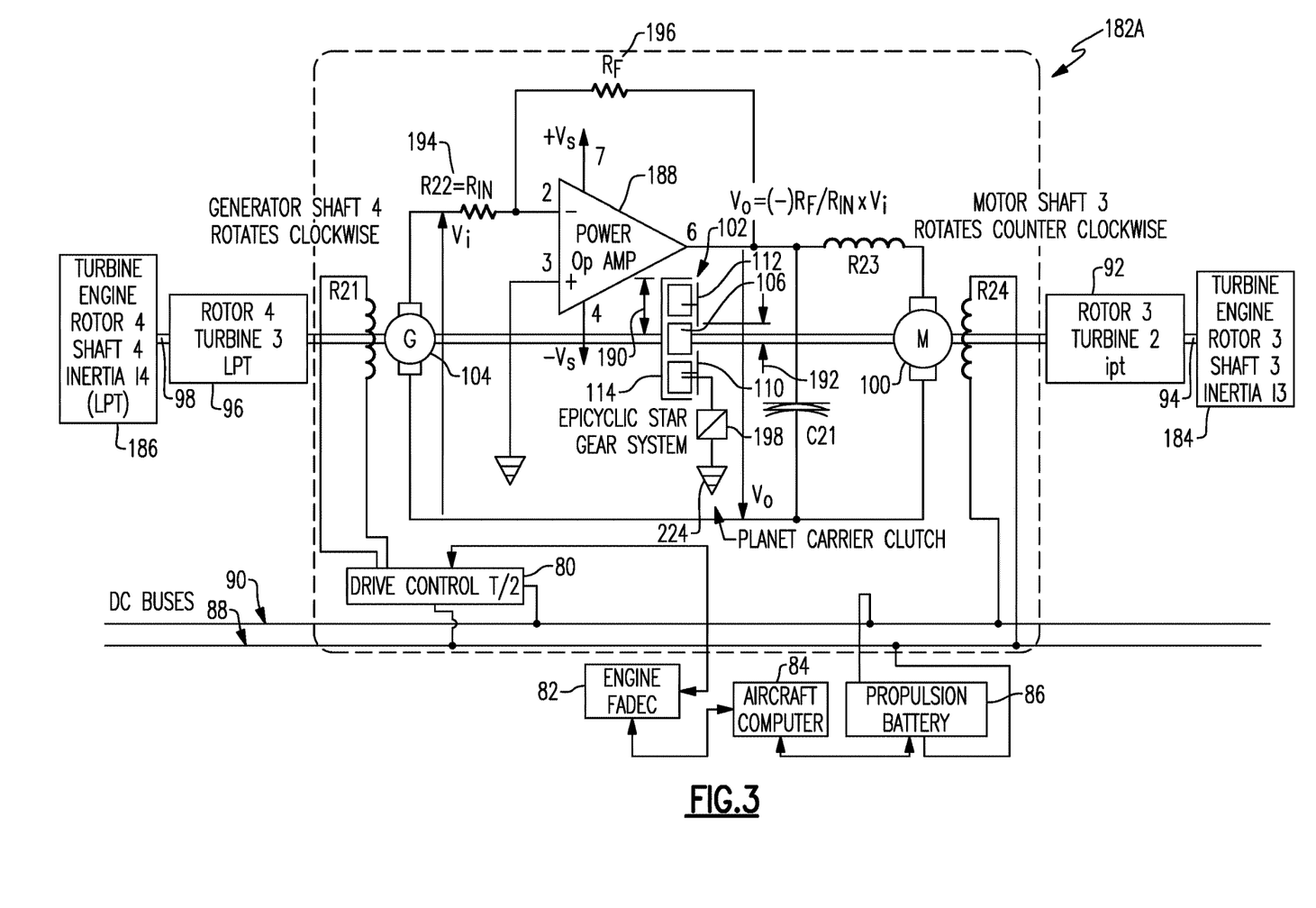
FIG. 3 is a schematic view of a control system for a fan drive system of the Electro-Aero-Thermal Turbine engine embodiment.

Referring to FIG. 3 with continued reference to FIG. 1, turbine drive and control system 182 is schematically shown and is augmented and controlled by an operational amplifier 188 providing an electrical coupling between the turbine motor 100 and turbine generator 104. The operational amplifier 188 is an electric analog to the mechanical epicyclic star gearbox 102. The motor 100, the generator 104 and the operational amplifier 188 match the mechanical gain of the gearbox 102 to bridge and coordinate the input of power to drive the fan section 28.

The turbine drive and control system 182A provides for coordination between the electric motor assisted third spool 115 and the second spool 118. As appreciated, the example drive and control system 182A is applicable to other drive configurations where power to one spool is supplemented by an electric motor. In this example, the intermediate turbine 92 drives the turbine electric motor 100 and other rotating structures such as the shaft 94 that combine to generate an inertia schematically indicated at 184. The third spool 115 includes the low pressure turbine 96 that is coupled to the gearbox 102 and the generator 104. The third spool 115 includes rotating structures such as the shaft 98 and portions of the gearbox 102 that combine to generate inertia 186. The example drive and control system 182 compensates for the differences in speeds and inertias 184, 186 to coordinate operation.

The resistances R21, R22, R23, and R24 of the drive control and electrical machines' fields and armatures along with the capacitance C21 is utilized to match and coordinate the speed response of the electric supplemented turbine 96 caused by differences in inertias. In this example, the inertia 186 can include portions of the gearbox 102, the fan and other fan structures. The inertia 184 is generated by intermediate pressure turbine 92 and load incurred by the turbine motor 100. The resistors R21, R22, R23, R24 and the capacitance C21 are the control parameters that are sized to coordinate operation between the two turbines 92, 96.

The motor 100, generator 104 and the operation amplifier 188 together bridge and coordinate operation of the LPT 96 and IPT 92. The operational amplifier input resistance $R_{IN}$ 194 is matched to the generator armature resistance R22. The feedback resistance 196, $R_F$, is set so that the electrical gain of the inverting operational amplifier matches the mechanical gain defined by the gearbox speed ratio. The example gearbox 102 is a star epicyclic gear system with the carrier 112 selectively coupled to a fixed structure of the gas turbine by a planet clutch 198. The mechanical gain is therefore equal to a ratio of a radius of the ring gear 190 to a radius of the sun gear 192 (Radius (ring)/Radius (sun). The electrical gain is equal to the ratio of the electric gain that is equal to ratio of the feedback resistance $R_F$ 196 to the input resistance $R_{IN}$ 194 that is the same as the inverting gain ($R_F$/R22). The clutched planet carrier 112 can be disengaged so that all elements are free to rotate, but the operational amplifier gain is coincident with the gear ratio and so, governs the gearbox element speeds.

Figure 4:
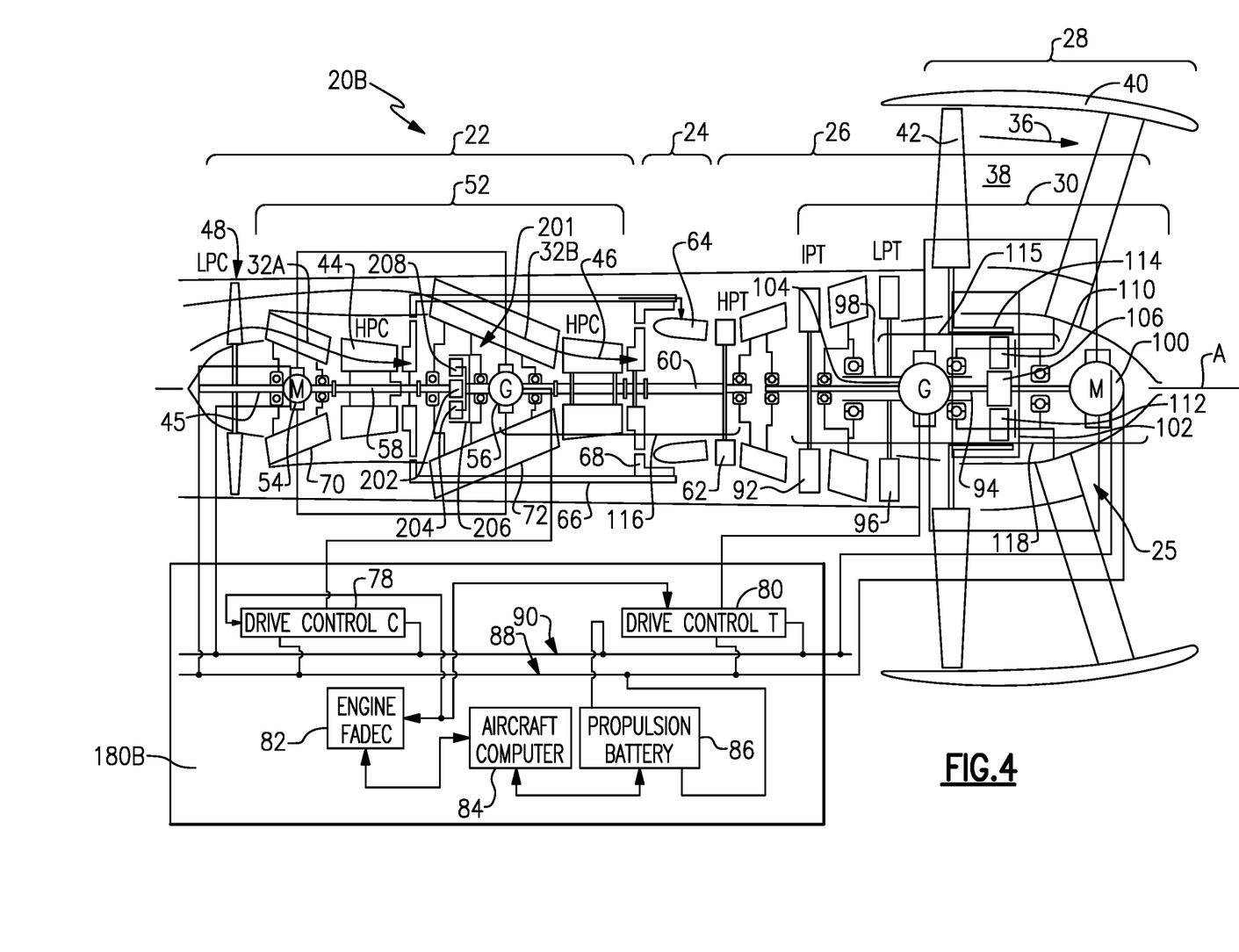
FIG. 4 is a schematic view of another example Electro-Aero-Thermal Turbine engine embodiment.
Figure 5:
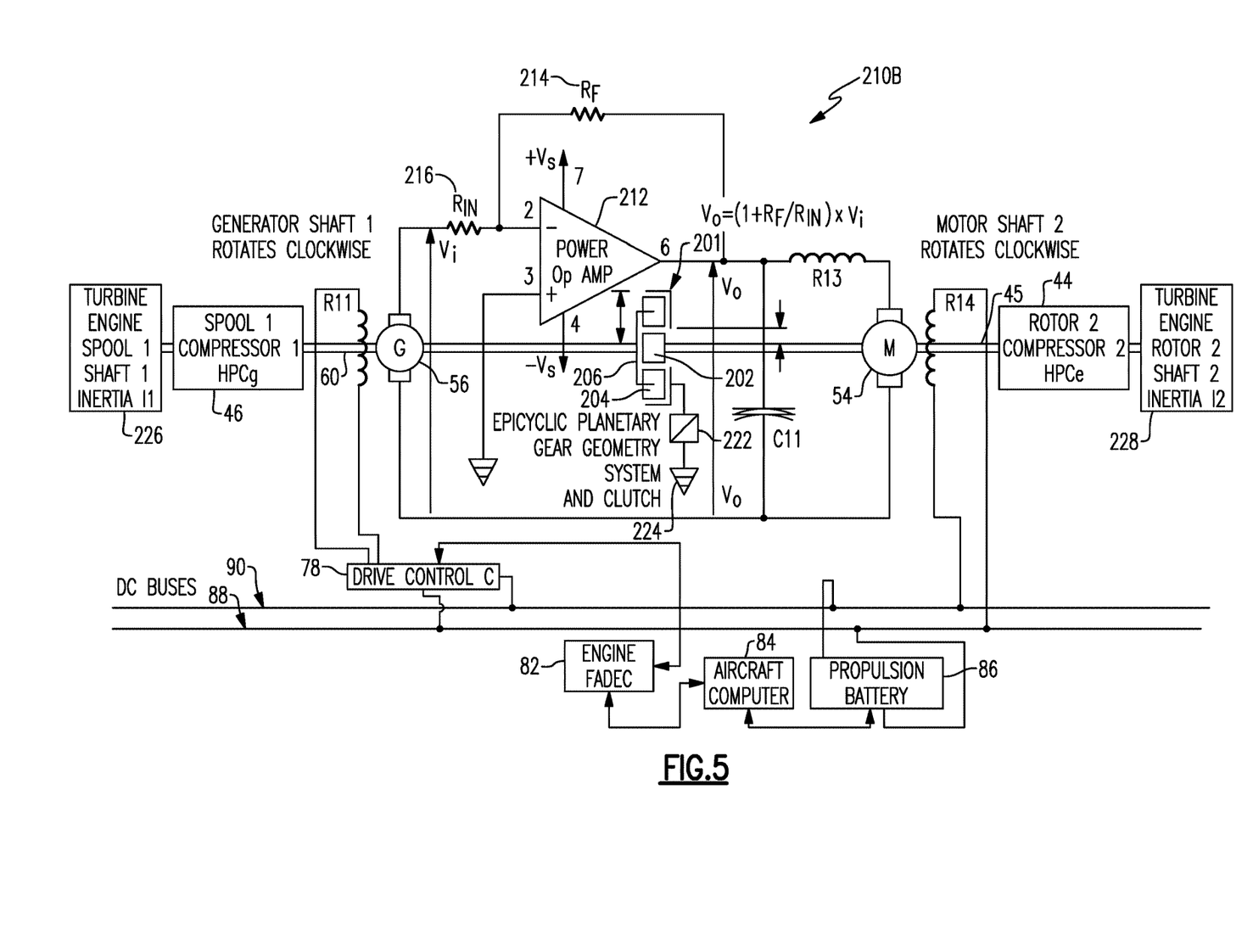
FIG. 5 is a schematic view of another control system for a compressor assembly of the Electro-Aero-Thermal Turbine engine embodiment.

Referring to FIGS. 4 and 5, another disclosed integrated engine architecture is schematically indicated at 20B. The engine 20B includes a compressor 52B and compressor drive control system 210B. The compressor 52B includes an epicyclic planet gearbox 201 with the clutch 222 selectively grounding the ring gear 206 to the engine static structure 224. All other features of the engine 20B are common with the engine 20A described and disclosed above.

The mechanical gain for a planetary gearbox as provided between the compressor generator 56 and the compressor motor 54 in this embodiment is equal to one plus the ratio of the ring gear radius to the sun gear radius, [1+[Radius (ring)/Radius (sun)]]. Accordingly, the control system 210B is configured such that the electric gain is equal to the mechanical gain of the planetary compressor gearbox 201. The electric gain is therefore equal to one plus the ratio of the feedback resistance $R_F$ 214 to the input resistance $R_{IN}$ 216, [1+($R_F/R_{IN}$)]. The compressor control system 210 provides control of an electrical coupling of the compressor generator 56 and the compressor motor 54 to provide matched operation of the first compressor section 44 and the second compressor section 46.

Figure 6:
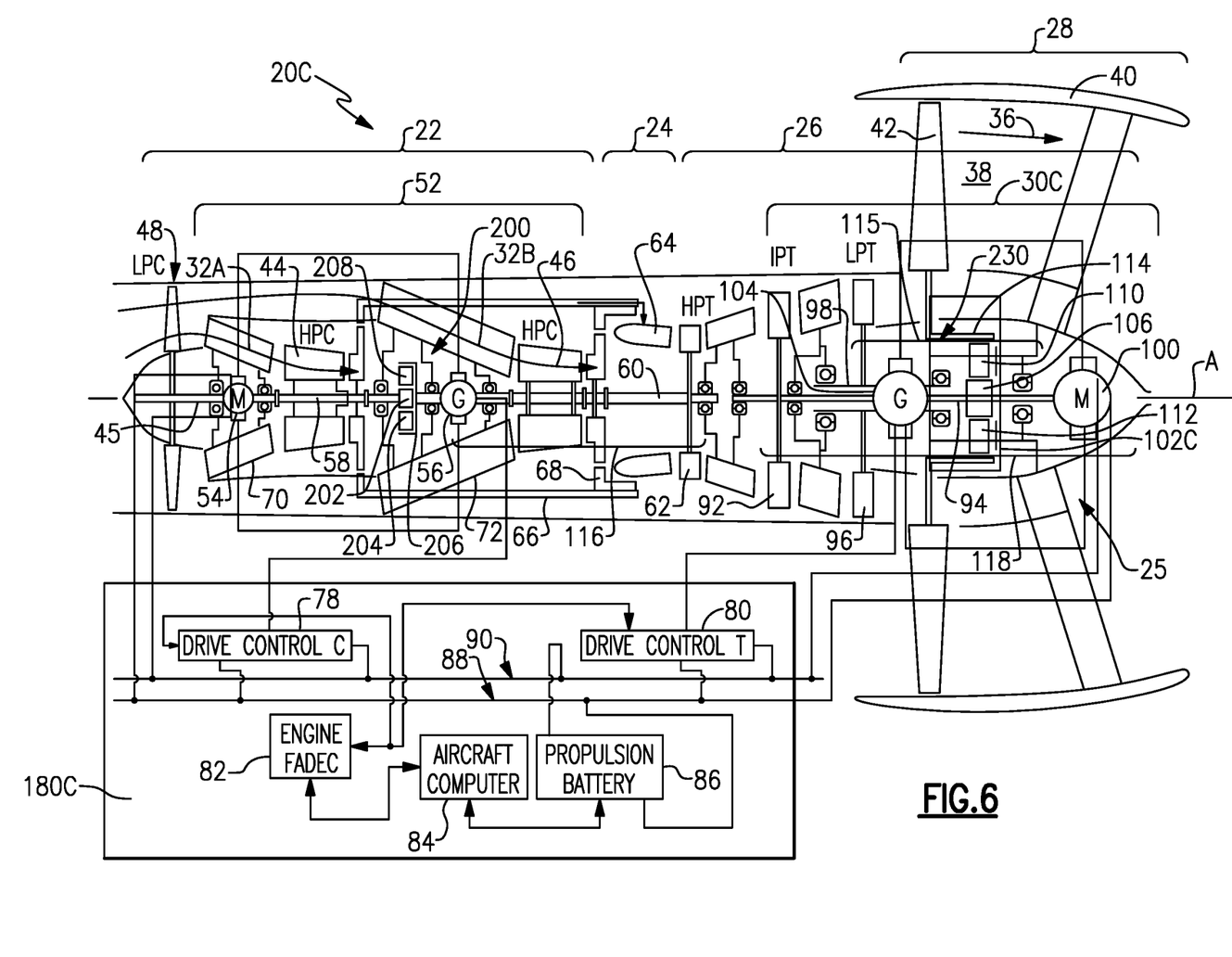
FIG. 6 is a schematic view of yet another example Electro-Aero-Thermal Turbine engine embodiment.
Figure 7:
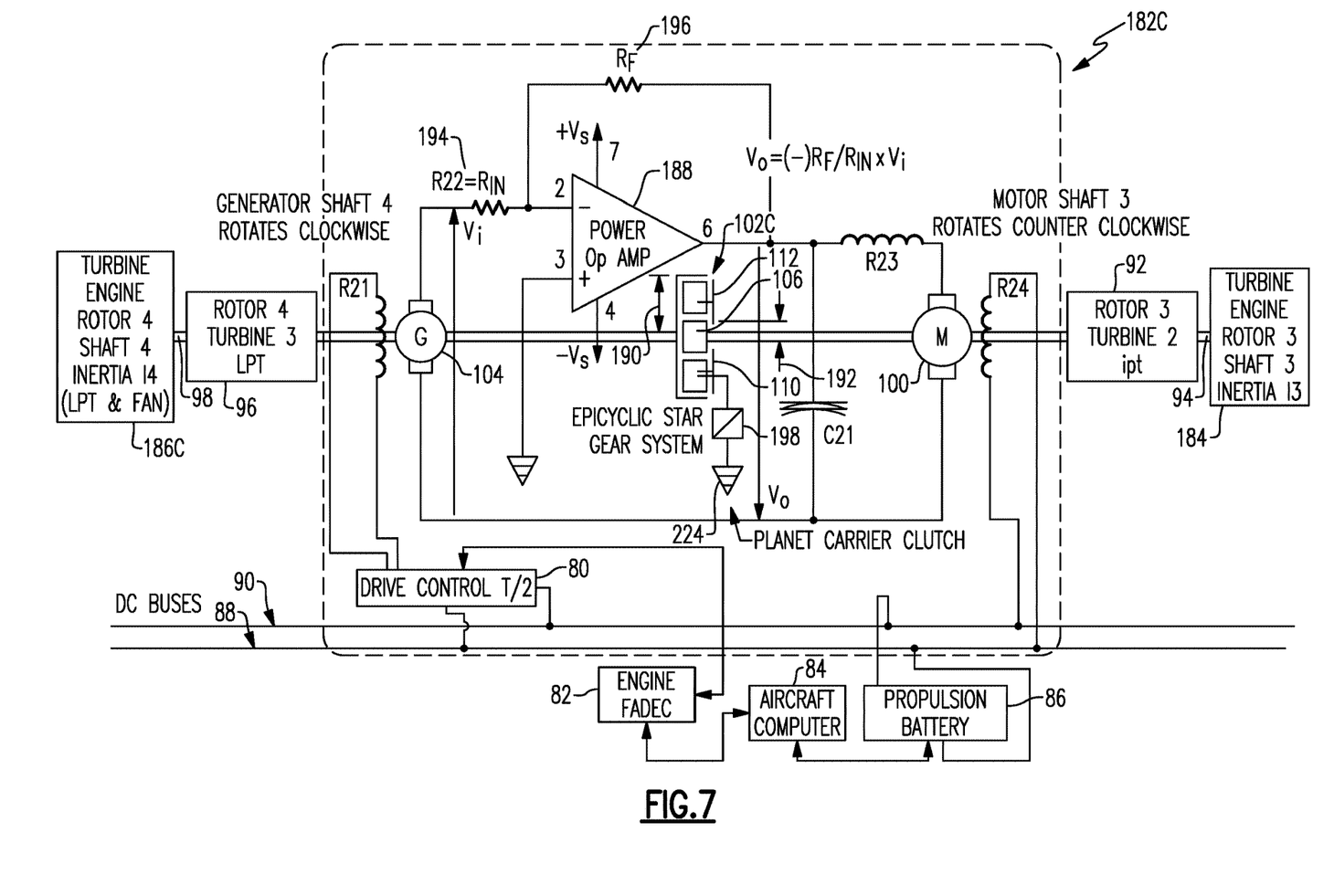
FIG. 7 is a schematic view of another control system for a fan drive system of the Electro-Aero-Thermal Turbine engine embodiment.

Referring to FIGS. 6 and 7, another disclosed integrated engine architecture is schematically indicated at 20C. The engine 20C includes a fan drive system 30C and turbine drive control system 182C. The compressor 52 is as disclosed and described in FIG. 1. The fan drive system 30 C includes a gearbox 102 with a ring gear 114 coupled to the shaft 98 and along with the generator 104 and the low pressure turbine 96. The fan blades 42 are coupled to the shaft 94 through a connection 230. The turbine control system 182C includes the operational amplifier 188 to match the mechanical gain defined by the gearbox 102. The addition of the fan coupled to the shaft 94 generates an increased inertia 186C. The example drive and control system 182C therefore compensates for the different inertia 186C due to the addition of the fan 28 being coupled to the shaft 94.

The mechanical gain is coupled to the shaft 98 and along with the generator 104 and the low pressure turbine 96. The fan blades 42 are coupled to the shaft 94 through a connection 230. The turbine control system 182C includes the operational amplifier 188 to match the mechanical gain defined by the gearbox 102. The addition of the fan coupled to the shaft 94 generates an increased inertia 186C. The example drive and control system 182C therefore compensates for the different inertia 186C due to the addition of the fan 28 being coupled to the shaft 98.

Figure 8:
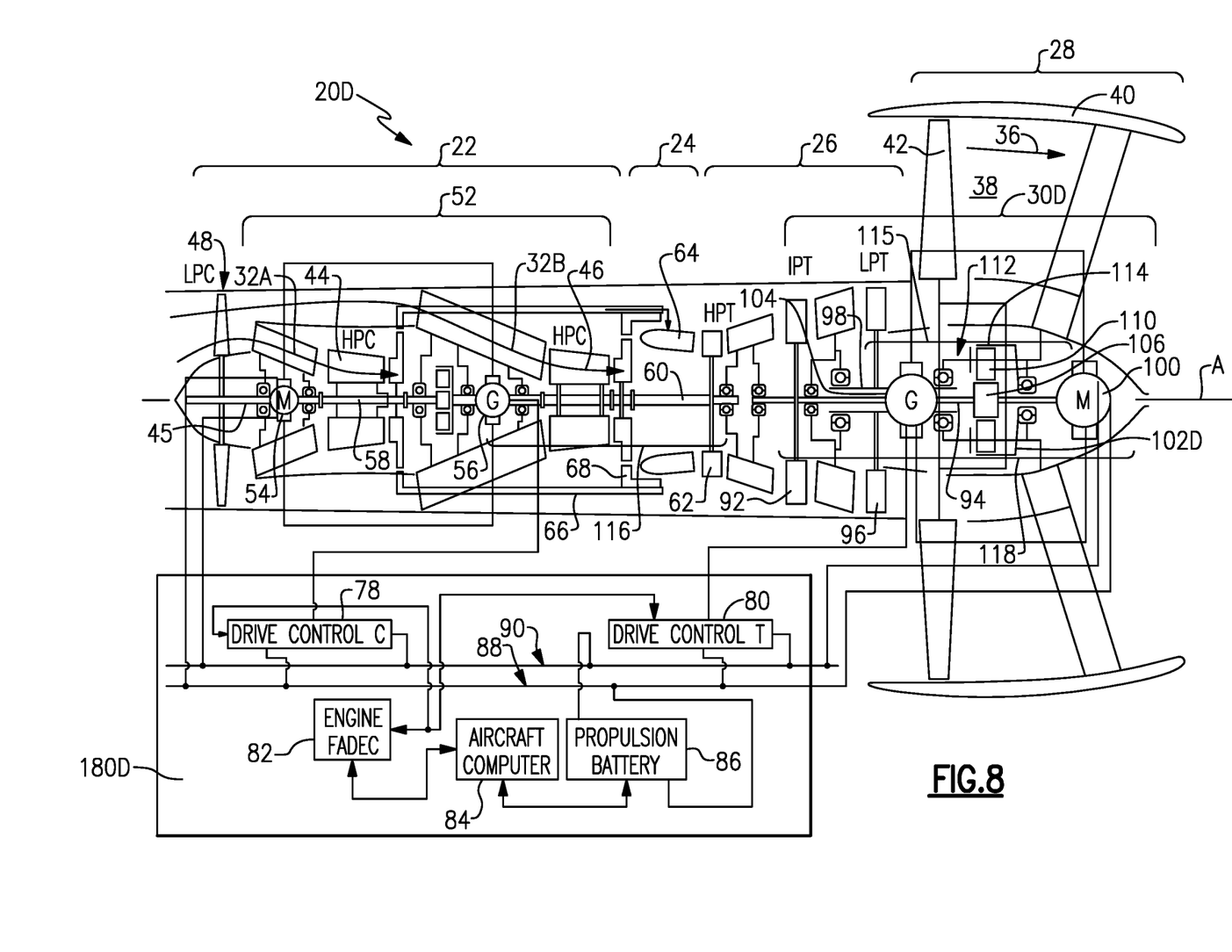
FIG. 8 is a schematic view of still another example Electro-Aero-Thermal Turbine engine embodiment.
Figure 9:
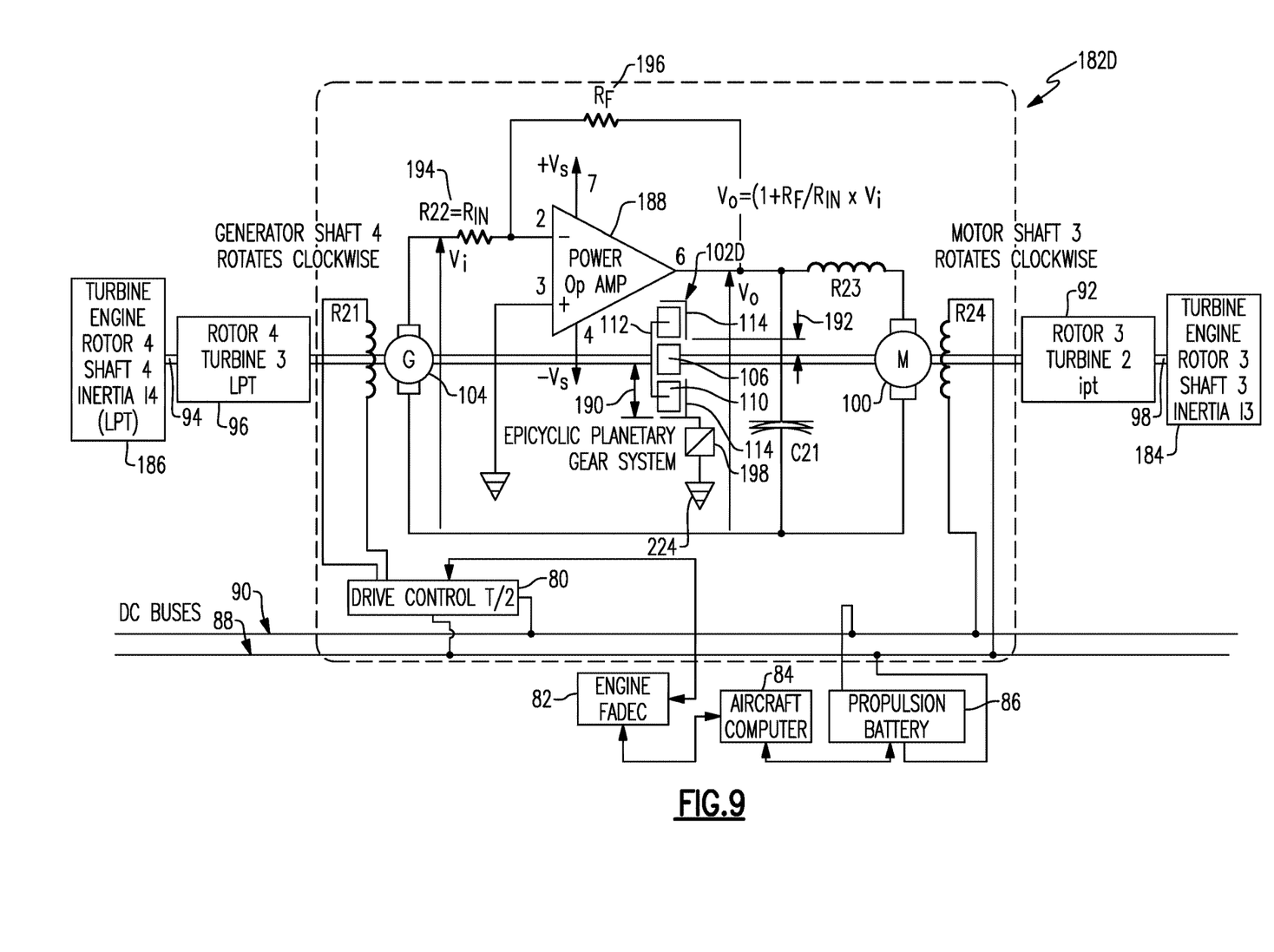
FIG. 9 is a schematic view of another control system for another fan drive system of the Electro-Aero-Thermal Turbine engine embodiment.

Referring to FIGS. 8 and 9, another disclosed integrated engine architecture is schematically indicated at 20D. The engine 20D includes a fan drive system 30D and turbine drive control system 182D. The compressor 52 is as disclosed and described in FIG. 1. The fan drive system 30D includes an epicyclic planet gearbox 102D with a carrier 112 coupled to the shaft 98 and thereby to the generator 104 and the low pressure turbine 96. The fan 28 is also coupled to be driven by the carrier 112. The ring gear 114 is selectively coupled to an engine static structure 224 through a clutch 198.

The mechanical gain for the planetary gearbox 102D is equal to one plus the ratio of the ring gear radius to the sun gear radius, [1+[Radius (ring)/Radius (sun)]]. Accordingly, the control system 182D is configured such that the electric gain is equal to the mechanical gain of the planetary compressor gearbox 102D. The electric gain is therefore equal to one plus the ratio of the feedback resistance $R_F$, 196 to the input resistance $R_{IN}$, 194, [1+($R_F$/$R_{IN}$)]. The turbine control system 182D provides control of an electrical coupling of the turbine generator 104 and the turbine motor 100 to provide matched operation and accommodate the inertias 184, 186.

Figure 10:
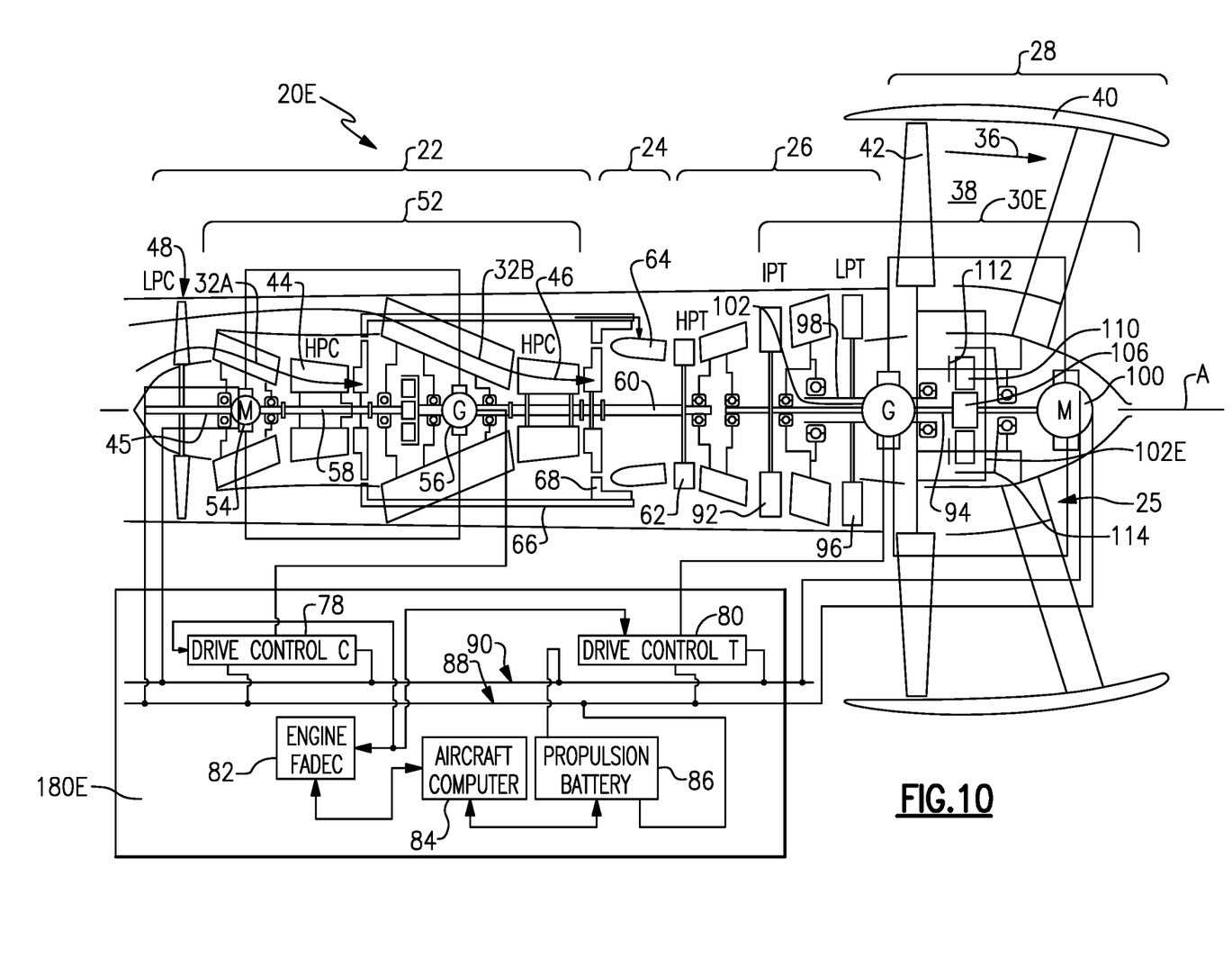
FIG. 10 is a schematic view of yet another example Electro-Aero-Thermal Turbine engine embodiment.
Figure 11:
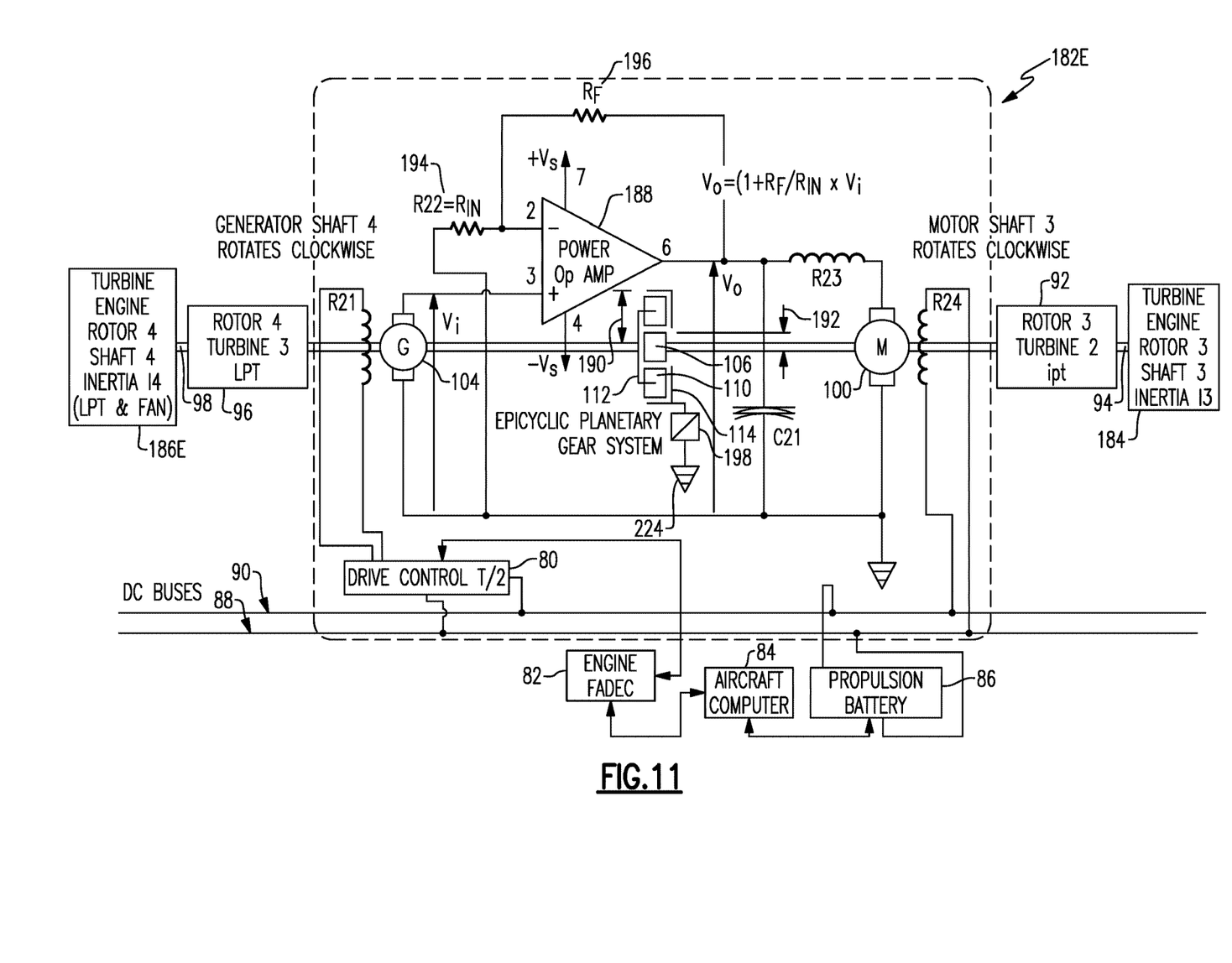
FIG. 11 is a schematic view of another control system for a fan drive system of the Electro-Aero-Thermal Turbine engine embodiment.

Referring to FIGS. 10 and 11, another disclosed integrated engine architecture is schematically indicated at 20E. The engine 20E includes a fan drive system 30E and turbine drive control system 182E. The compressor 52 is as disclosed and described in FIG. 1. The fan drive system 30E includes an epicyclic planet gearbox 102E with the carrier 112 coupled to the shaft 98 and thereby to the generator 104 and the low pressure turbine 96. The fan 28 is also coupled to be driven by the carrier 112. The ring gear 114 is selectively coupled to an engine static structure 224 through a clutch 198.

It is within the contemplation of this disclosure that each of the disclosed compressor system embodiments can be combined and operate with any of the fan drive system embodiments to provide increased overall engine propulsive efficiency.

Separately or in combinations, the disclosed engines 20A-E integrate electric machines into the compressor and fan drive systems to increase overall engine efficiency. The operational amplifier control systems provide matching between gas and electric powered systems improved compatibility with the turbine engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a generator configured to be driven by a turbine section;
an electric motor configured to receive at least a portion of electric power from the generator;
a gearbox mechanically coupled to both the electric motor and the generator, wherein the gearbox is an epicyclic star gear system with a sun gear, a plurality of intermediate gears in meshing engagement with the sun gear and a ring gear in meshing engagement with the plurality of intermediate gears, wherein a mechanical gain defined by the gearbox is equal to a ratio of a radius of the ring gear to a radius of the sun gear and wherein the plurality of intermediate gears are supported in a carrier and the carrier is selectively grounded to a fixed structure of the gas turbine engine; and
a control system having an operational amplifier configured to synchronize operation of the electric motor and the generator, the operational amplifier electrically coupling the electric motor to the generator and configured to define an electrical gain matching the mechanical gain defined by the gearbox, wherein the electrical gain is equal to a ratio of a feedback resistance ($R_F$) to an input resistance ($R_{IN}$) and the electrical gain is equal to the mechanical gain.

2. The gas turbine engine as recited in claim 1, wherein the ring gear is coupled to the generator and the electric motor is coupled to the sun gear.

3. A gas turbine engine comprising:
a generator configured to be driven by a turbine section;
an electric motor configured to receive at least a portion of electric power from the generator;
a gearbox mechanically coupled to both the electric motor and the generator, wherein the gearbox is an epicyclic planet gear system with a sun gear in meshing engagement with a plurality of intermediate gears supported in a carrier and the plurality of intermediate gears are in meshing engagement with a ring gear, the electric motor is coupled to the sun gear, the generator is coupled to a carrier, a mechanical gain defined by the gearbox is equal to one plus a ratio of a diameter of the ring gear to a diameter of the sun gear and the ring gear is selectively grounded to a fixed structure of the gas turbine engine; and
a control system having an operational amplifier configured to synchronize operation of the electric motor and the generator, the operational amplifier electrically coupling the electric motor to the generator and configured to define an electrical gain matching the mechanical gain defined by the gearbox, wherein the electrical gain is equal to one plus a ratio of a feedback resistance ($R_F$) to an input resistance ($R_{IN}$) and the electrical gain is equal to the mechanical gain.

4. The gas turbine engine as recited in claim 1, including a fan configured to be driven by an output of the gearbox.

5. The gas turbine engine as recited in claim 1, including a compressor with a first compressor section configured to be driven by the turbine section and a second compressor section configured to be driven by the electric motor.

6. A gas turbine engine comprising:
a fan configured for rotation about an engine longitudinal axis;
a fan drive system configured to drive the fan, the fan drive system including a turbine section, a turbine generator electrically coupled to a turbine motor and a gear box, wherein the turbine section and the turbine motor are coupled to drive portions of the gearbox, an output of the gearbox is configured to drive rotation of the fan and the gearbox is an epicyclic star gear system with a sun gear, a plurality of intermediate gears in meshing engagement with the sun gear and a ring gear in meshing engagement with the plurality of intermediate gears with the sun gear is coupled to the electric motor and a mechanical gain defined by the gearbox is equal to a ratio of a radius of the ring gear to a radius of the sun gear; and a control system configured to synchronize operation of the turbine generator with the turbine motor, the control system having an operational amplifier providing an electrical gain, wherein the electrical gain is configured to match the mechanical gain defined by the gearbox to synchronize operation of the turbine motor with the turbine generator, the electrical gain is equal to a ratio of a feedback resistance ($R_F$) to an input resistance ($R_{IN}$) and the electrical gain is equal to the mechanical gain, the output of the gearbox configured to drive the fan is the ring gear, the plurality of intermediate gears are supported in a carrier, and the carrier is selectively grounded to a fixed structure of the gas turbine engine.

7. The gas turbine engine as recited in claim 6, wherein the turbine section includes a low pressure turbine and the turbine generator is coupled to the low pressure turbine and both the low pressure turbine and the turbine generator are coupled to the ring gear.

8. A gas turbine engine comprising:
a fan configured for rotation about an engine longitudinal axis;
a fan drive system configured to drive the fan, the fan drive system including a turbine section, a turbine generator electrically coupled to a turbine motor and a gearbox, wherein the turbine section and the turbine motor are coupled to drive portions of the gearbox, an output of the gearbox is configured to drive rotation of the fan and the gearbox is an epicyclic planet gear system with a sun gear in meshing engagement with a plurality of intermediate gears supported in a carrier, the plurality of intermediate gears are in meshing engagement with a ring gear, the turbine motor is coupled to the sun gear, the turbine generator is coupled to the carrier, a mechanical gain defined by the gearbox is equal to one plus a ratio of a diameter of the ring gear to a diameter of the sun gear; and
a control system configured to synchronize operation of the turbine generator with the turbine motor, the control system having an operational amplifier providing an electrical gain, wherein the electrical gain is configured to match the mechanical gain defined by the gearbox to synchronize operation of the turbine motor with the turbine generator, the electrical gain is equal to one plus a ratio of a feedback resistance ($R_F$) to an input resistance ($R_{IN}$) and the electrical gain is equal to the mechanical gain defined by the gearbox and the gearbox output configured to drive the fan is the carrier and the ring gear is selectively grounded to a fixed structure of the gas turbine engine.

9. The gas turbine engine as recited in claim 8, wherein the turbine section includes a low pressure turbine and the turbine generator is coupled to the low pressure turbine and both the low pressure turbine and the turbine generator are coupled to the carrier.

10. A gas turbine engine comprising:
a compressor assembly including a first compressor section and a second compressor section, the first compressor section is coupled to a turbine section and a compressor generator, the second compressor section coupled to a compressor motor, wherein the first compressor section and the second compressor section are in flow communication with a combustor;
a gearbox configured to couple the compressor motor to the compressor generator wherein the gearbox is an epicyclic star gear system with a sun gear, a plurality of intermediate gears in meshing engagement with the sun gear and a ring gear in meshing engagement with the plurality of intermediate gears supported in a carrier, and the carrier is capable of being selectively grounded to a fixed structure of the gas turbine engine; and
a control system configured to synchronize operation of the compressor generator with the compressor motor, the control system having an operational amplifier providing an electrical gain, wherein the electrical gain is matched to a mechanical gain defined by the gearbox to synchronize operation of the compressor motor with the compressor generator, the sun gear is coupled to the compressor motor and the mechanical gain of the gearbox is equal to a ratio of a radius of the ring gear to a radius of the sun gear and the electrical gain is equal to a ratio of a feedback resistance ($R_F$) to an input resistance ($R_{IN}$) and the electrical gain is equal to the mechanical gain.

11. The gas turbine engine as recited in claim 10, wherein the gearbox is an epicyclic planet gear system with a sun gear in meshing engagement with a plurality of intermediate gears supported in a carrier, the plurality of intermediate gears are in meshing engagement with a ring gear, the compressor motor is coupled to the sun gear, the compressor generator is coupled to the carrier, the mechanical gain is equal to one plus a ratio of a diameter of the ring gear to a diameter of the sun gear and the electrical gain is equal to one plus a ratio of a feedback resistance ($R_F$) to an input resistance ($R_{IN}$) and the electrical gain is equal to the mechanical gain.

12. The gas turbine engine as recited in claim 11, wherein the ring gear is selectively grounded to a fixed structure of the gas turbine engine.

13. The gas turbine engine as recited in claim 3, including a fan configured to be driven by an output of the gearbox.

14. The gas turbine engine as recited in claim 3, including a compressor with a first compressor section configured to be driven by the turbine section and a second compressor section configured to be driven by the electric motor.

* * * * *